US008063920B2

(12) United States Patent
De Haan et al.

(10) Patent No.: US 8,063,920 B2
(45) Date of Patent: Nov. 22, 2011

(54) DISPLAY TIME CONTROL FOR IMAGES

(75) Inventors: Gerard De Haan, Eindhoven (NL); Leo Jan Velthoven, Eindhoven (NL); Michiel Adriaanszoon Klompenhouwer, Eindhoven (NL)

(73) Assignee: Koninklijke Philips Electronics N.V. (NL)

( * ) Notice: Subject to any disclaimer, the term of this patent is extended or adjusted under 35 U.S.C. 154(b) by 1086 days.

(21) Appl. No.: 11/576,911

(22) PCT Filed: Oct. 10, 2005

(86) PCT No.: PCT/IB2005/053312

§ 371 (c)(1), (2), (4) Date: Apr. 9, 2007

(87) PCT Pub. No.: WO2006/040722

PCT Pub. Date: Apr. 20, 2006

(65) Prior Publication Data

US 2008/0042953 A1 Feb. 21, 2008

(30) Foreign Application Priority Data

Oct. 13, 2004 (EP) .................................... 04105020

(51) Int. Cl.
*G09G 5/10* (2006.01)
*H04N 5/00* (2011.01)

(52) U.S. Cl. ......... 345/690; 348/609; 348/611; 348/614

(58) Field of Classification Search .......... 345/690–693, 345/204, 589, 596–599, 611; 348/609–614
See application file for complete search history.

(56) References Cited

U.S. PATENT DOCUMENTS

| | | | | |
|---|---|---|---|---|
| 6,987,530 | B2 * | 1/2006 | McConica | 348/208.6 |
| 7,046,262 | B2 * | 5/2006 | Feng et al. | 345/691 |
| 7,317,445 | B2 * | 1/2008 | Hekstra et al. | 345/102 |
| 2002/0003522 | A1 | 1/2002 | Baba et al. | |
| 2002/0015104 | A1 | 2/2002 | Itoh et al. | |

FOREIGN PATENT DOCUMENTS

| | | | |
|---|---|---|---|
| EP | 0657860 | A2 | 6/1995 |
| WO | 03101086 | A2 | 12/2003 |

* cited by examiner

*Primary Examiner* — Jimmy H Nguyen

(57) ABSTRACT

This invention relates to a method, a computer program, a computer program product and a device for reducing motion blur of images shown on non-stroboscopic display devices, in which local areas $p_i$ of an image of a video signal are displayed during respective local display times $t_i$ that are less than or equal to a image period T, comprising determining (40) an amount $X_i$ of high spatial frequency content related to a local area $p_i$ of said image of said video signal, and adjusting (41) a local display time $t_i$ in dependence on said determined amount $X_i$ of high spatial frequency content, wherein said local display time $t_i$ is decreased with increasing determined amount $X_i$ of high spatial frequency content.

13 Claims, 3 Drawing Sheets

Transfer function of display + eye combination duty cycle 100%

Transfer function of display + eye combination duty cycle 30%

DISPLAY TIME CONTROL FOR IMAGES

FIELD OF THE INVENTION

This invention relates to a method for reducing motion blur of images shown on non-stroboscopic display devices.

BACKGROUND OF THE INVENTION

Non-stroboscopic non-emissive displays, such as Liquid Crystal Displays (LCD), active-matrix LCDs (amLCD), Plasma Panel Displays (PDP), Thin Film Transistor (TFT) displays, Liquid Crystal on Silicon (LCOS) displays or Colour Sequential Displays, consist of a display panel having a row and column array of image elements (pixels) for modulating light, means for illuminating the display panel from the front or back side, and drive means for driving the pixels in accordance with an applied input video signal. Quite similar, non-stroboscopic emissive displays, such as Organic Light Emitting Diodes (O-LED) displays, Polymer Light Emitting Diodes (PLED) displays, active-matrix PLEDs (amPLED) displays or Plasma Display Panels (PDP), consist of a display panel having a row and column array of pixels (LEDs) and drive means for driving the pixels (LEDs) in accordance with an applied input video signal. However, the pixels (LEDs) emit and modulate light by themselves without requiring illumination from the front or back side.

In state-of-the-art Cathode Ray Tubes (CRTs), each pixel of a displayed image is generated as a pulse, which is very short compared to the image period T. Different to these state-of-the-art CRTs, in new flat, high quality, low cost non-stroboscopic display devices, each pixel is displayed during most of the image period. Of course, this non-stroboscopic behavior also holds for types of CRTs whose pixels, e.g. slow phosphor atoms, are active for a time not negligible to the image period. In the sequel of this description, we thus will only differentiate between stroboscopic and non-stroboscopic displays, and in case of a non-stroboscopic display, we will use the term "pixel" for both the elements of a light modulation/generation array and the activated (slow) atoms of a CRT-type display.

In case any area of the image displayed on a non-stroboscopic display contains motion, the viewer will track this motion. As each pixel is displayed substantially the whole image period, the intensity of pixels showing the motion is integrated along the motion trajectory as follows:

$$F_{out}(\vec{x}, n) = \frac{1}{t_i}\int_0^{t_i} F\left(\vec{x} + \frac{t}{T}\vec{D}, n\right)dt \tag{1}$$

with $t_i$ as display time of each image, F as input video signal, $F_{out}$ as output video signal, and T as image period. The motion vector $\vec{D}=\vec{v}T$ is the product of the object velocity $\vec{v}$ and the image period T. In case $t_i$ is constant, the integration is the same as a convolution of $F(\vec{x}, n)$ and a sample-and-hold function $h(\alpha)$:

$$\begin{aligned} F_{out}(\vec{x}, n) &= \frac{T}{t_i}\int_0^{\frac{t_i}{T}} F\left(\vec{x} + \alpha\vec{D}, n\right)d\alpha \\ &= \int_{-\infty}^{\infty} F\left(\vec{x} + \alpha\vec{D}, n\right)\cdot h(\alpha)d\alpha \end{aligned} \tag{2}$$

where $$h(\alpha) = \begin{cases} T/t_i, & 0 \le \alpha \le t_i/T \\ 0, & \text{otherwise} \end{cases} \tag{3}$$

is a 1D block function, oriented along the motion vector $\vec{D}$. It is therefore actually a 2D function $h(\vec{x})$, which has zero value outside the line segment $\vec{x}=k\vec{D}$, $0\leqq k\leqq t_i/T$, while the 2D integral area is normalized to 1. The 2D spatial Fourier transform (leading to a representation of $h(\vec{x})$ in the spatial frequency domain) of Eq. (2) yields:

$$\begin{aligned} F_{out}(\vec{f}, n) &= \int_{-\infty}^{\infty}\int_{-\infty}^{\infty} F_{out}(\vec{x}, n)e^{\left(-j2\pi\vec{x}\vec{f}\right)}d\vec{x} \\ &= F(\vec{f}, n)\cdot H(\vec{f}) \end{aligned} \tag{4}$$

with $F(\vec{f}, n)$ denoting the 2D spatial Fourier transform of the input video signal $F(\vec{x}, n)$, and $H(\vec{f})$ denoting the 2D spatial Fourier transform of $h(\vec{x})$:

$$H(\vec{f}) = \frac{\sin\left(\pi\vec{D}\frac{t_i}{T}\vec{f}\right)}{\pi\vec{D}\frac{t_i}{T}\vec{f}} = \mathrm{sinc}\left(\pi\vec{D}\frac{t_i}{T}\vec{f}\right). \tag{5}$$

Apparently the effect of the motion tracking/temporal sample-and-hold characteristic is a spatial frequency low-pass filtering in the direction of the motion with a sinc-frequency response, with a cut-off-frequency being inversely proportional to the quantity $$\frac{t_i}{T}\vec{D},$$

where $$\frac{t_i}{T}$$

is denoted as the duty cycle of the display. The non-stroboscopic light generation, combined with the eye tracking of the viewer trying to follow moving objects from one image to the next, thus leads to the perception of motion-dependent blur in the images. When the motion $\vec{D}$ in the image increases, the cut-off-frequency of the spatial low pass filter and thus the degree of perceived motion blur can be kept constant by reducing the display time $$t_i\left(\text{or the duty cycle } \frac{t_i}{T}\right)$$

with the drawback of loss of brightness and increased flicker.

To reduce motion blur, loss of brightness and flicker, prior art document WO 03/101086 A2 proposes to measure the motion and the characteristics of motion in the images of the input video signal and to continuously adjust the display time $t_i$ depending on this measured motion and the characteristics of motion. In a preferred embodiment, additionally anti-motion blur filtering based on the measured motion vectors is performed, and the display time and the sort and amount of anti-motion blur filtering are jointly controlled based on the measured motion and the characteristics of motion. In a further preferred embodiment, local image characteristics that determine high spatial frequencies are considered in the filtering process and in the joint control of display time and sort and amount of anti-motion blur filtering, because these characteristics contain information on how reliable anti-motion blur filtering can be performed. To reduce loss of brightness, WO 03/101086 A2 proposes to control the light output of the display inversely proportional to the display time, and, to reduce flicker, it is targeted to keep the display time as large as possible and to suppress motion blur with anti-motion blur filtering instead of reducing the display time.

All embodiments of WO 03/101086 A2 require the estimation of both the amount and the direction of motion vectors and thus require frame memories and computationally expensive real-time motion estimation algorithms. This proposed display system is thus complex and expensive when being implemented.

SUMMARY OF THE INVENTION

In view of the above-mentioned problem, it is thus, inter alia, an object of the present invention to provide a low-complexity method, computer program, computer program product and device for reducing motion blur of images shown on non-stroboscopic display devices.

A method is proposed for reducing motion blur of images shown on non-stroboscopic display devices, in which local areas $p_i$ of an image of a video signal are displayed during respective local display times $t_i$ that are less than or equal to an image period T, comprising determining an amount $X_i$ of high spatial frequency content related to a local area $p_i$ of said image of said video signal, and adjusting a local display time $t_i$ in dependence on said determined amount $X_i$ of high spatial frequency content, wherein said local display time $t_i$ is decreased with increasing determined amount $X_i$ of high spatial frequency content.

Said display device is a non-stroboscopic display device in the sense that when displaying images of said video signal, it generates, transmits or reflects light during display times $t_i$ that are not negligible with respect to the image period T. Said display device may be an emissive or a non-emissive display, and said local display times $t_i$ during which images of said video signal are displayed on said display then may refer to the times in which LEDs of said emissive display emit light or in which portions of the back-lights of said non-emissive displays are illuminated, respectively. Said display device may be integrated in all kinds of electronic devices that require a visual human-machine interface, for instance a television, a computer, a hand-held mobile device, a head-up system, an instrument or similar.

Said video signal is composed of images that are displayed sequentially on said display device, wherein each image is spatially composed of a plurality of local areas $p_i$, and wherein each local area $p_i$ is displayed during an associated local display time $t_i$ either in said emissive or non-emissive manner. Said local areas $p_i$ may for instance represent a group of adjacent pixels of an image, or all pixels of an image, so that the image is only composed of one local area $p_i$ that equals the image and only one associated local display time $t_i$.

An amount $X_i$ of high spatial frequency content related to a respective local area $p_i$ of said image of said video signal is determined, wherein said amount $X_i$ of high spatial frequency content characterises the high spatial frequency range of the spatial frequency domain spectrum of said local area $p_i$ of said image of said video signal, for instance, the sum of the magnitude of the spectrum coefficients for a certain high spatial frequency range, or a maximum spectrum coefficient in a certain high spatial frequency range, or the at least partial integration of the high-pass filtered local area $p_i$ of said image of said image signal, or similar. Content in the high spatial frequency region of the spectrum of an image may for instance be caused by pronounced differences between pixels of an image, such as edges, abrupt colour or brightness transitions, textures etc.

In dependence on said determined amount $X_i$ of high spatial frequency content related to a respective local area $p_i$ of said image, said local display time $t_i$ that is related to the same local area $p_i$ of said image is adjusted, wherein said local display time $t_i$ is decreased with increasing determined amount $X_i$ of high spatial frequency content. In said adjustment, said display time $t_i$ may be assigned continuous or discrete values between 0 and T.

The present invention recognises that the occurrence of motion blur caused by the sample-and-hold characteristic of the non-stroboscopic display device is not only linked to motion in the images, but also to the presence of high spatial frequency content in the images, such as for instance textures or edges. The present invention thus proposes to check on the presence of high spatial frequency content in the areas $p_i$ of said image of said video signal and to adjust the display time $t_i$ in dependence on the amount $X_i$ of this high spatial frequency content. This allows for a simplified implementation of the display system, because the amount $X_i$ of high spatial frequency content is easily determined, for instance, by means of a spatial frequency high-pass filter and does not require the deployment of computationally expensive motion estimation algorithms.

According to the present invention, said adjusting of said local display time $t_i$ may depend on only one image-related characteristic of said video signal, and said only one image-related characteristic of said video signal may be said amount $X_i$ of high spatial frequency content related to said local area $p_i$ of said image of said video signal. In particular, said adjusting of said display time then does not depend on the motion in said image of said video signal, so that no computationally expensive motion estimation and no frame memories are required.

According to a preferred embodiment of the present invention, said determining of said amount $X_i$ of high spatial frequency content related to said local area $p_i$ of said image of said video signal comprises at least partially filtering said local area $p_i$ with a spatial frequency domain high-pass filter.

According to this preferred embodiment of the present invention, an output of said spatial frequency domain high-pass filter may at least partially be combined to obtain said amount $X_i$ of high spatial frequency content related to said local area $p_i$ of said image of said video signal. For instance, the samples or the magnitude of the samples output by said high-pass filter may at least partially be summed to obtain said amount $X_i$ of high spatial frequency content.

According to this preferred embodiment of the present invention, said local display time $t_i$ is set to a maximum value if said amount $X_i$ of high spatial frequency content is below a first threshold $k_1$, and said local display time $t_i$ is set to a minimum value if said amount $X_i$ of high spatial frequency content is above a second threshold $k_2$.

According to this preferred embodiment of the present invention, said local display time $t_i$ decreases from said maximum value to said minimum value when said amount $X_i$ of high spatial frequency content increases from said first threshold $k_1$ to said second threshold $k_2$.

According to this preferred embodiment of the present invention, said local display time decreases linearly from said maximum value to said minimum value.

A further preferred embodiment of the present invention further comprises adjusting the light intensity, with which said local area $p_i$ of said image of said video signal is displayed on said non-stroboscopic display, in dependence on said adjusted local display time $t_i$. To avoid loss of brightness when reducing the local display time $t_i$, it is advantageous to increase the light intensity with which said local area $p_i$ is illuminated inversely proportional to the reduction of the local display time $t_i$. In a non-emissive display, this may be accomplished by controlling the back-lights, and in an emissive display, this may be achieved by controlling the LEDs themselves.

According to a further preferred embodiment of the present invention, said local display time stems from a limited set of discrete local display times. This may further reduce the complexity of the display system.

According to this preferred embodiment of the present invention, said determining of said amount $X_i$ of high spatial frequency content related to said local area $p_i$ of said image of said video signal is based on a area of said image of said video signal that is larger than said local area $p_i$. Said area may for instance comprise adjacent pixels or areas around said local area $p_i$. This may contribute to avoiding abrupt changes in the determined amounts $X_i$ of high spatial frequency content related to respective adjacent local areas $p_i$ and thus to avoiding abrupt changes in the corresponding adjusted local display times $t_i$, which may cause inconsistencies in the spatio-temporal light emission pattern. Such inconsistencies may cause unwanted effects depending on the eye tracking of the viewer, like e.g. flashes as the edges of moving components.

A further preferred embodiment of the present invention further comprises determining an amount of temporal differences in said local area $p_i$ of said image of said video signal, wherein said local display time $t_i$ is only decreased with increasing determined amount $X_i$ of high spatial frequency content in dependence on said determined amount of temporal differences.

The present invention recognises that motion blur in non-stroboscopic display devices occurs only in areas with high spatial frequency content and motion. For the lowest complexity of the display system, the amount of spatial frequency content of a local area $p_i$ may be determined and used as a basis for the adjustment of the local display time $t_i$. To avoid a reduction of the display times $t_i$ for local areas that have high spatial frequency content but no motion, which causes either a loss of brightness, flicker, or, if the light intensity of the display is controlled inversely proportional to the local display times $t_i$, a reduction of the life time of the display elements, an additional determination of the amount of temporal differences in said local area $p_i$ is integrated according to this embodiment of the present invention, wherein said temporal differences serve as a coarse measure for the amount of motion in said local area $p_i$, but are much simpler to be determined, for instance by subtracting corresponding pixels of corresponding local areas $p_i$ in two subsequent images of said video signal, or by temporal low-pass filtering. Based on the determined amount of spatial frequency content and the determined amount of temporal differences, both related to a local area $p_i$, the optimum local display time $t_i$ is adjusted. With only the temporal differences, and not the 2D motion vectors being required for the adjustment, the resulting display system is still of low complexity, in the simplest case only a temporal low-pass filter is required to estimate the amount of temporal differences. The adjustment of the local display time then may for instance comprise an enquiry if the determined amount of temporal differences exceeds a threshold, which may be pre-determined or adaptively determined, e.g. based on the overall amount of temporal differences in the images of the video signal. In effect, then the local display time $t_i$ is only reduced with increasing amount of high spatial frequency content if there is sufficient motion, so that otherwise motion blur would result.

A computer program is further proposed with instructions operable to cause a processor to perform the above-mentioned method steps. Said computer program may for instance be processed by a central processing unit of said display device.

A computer program product is further proposed comprising a computer program with instructions operable to cause a processor to perform the above-mentioned method steps. Said computer program product may for instance be a removable storage medium such as a disc, a CD-ROM, DVD, a memory stick or memory card.

A device is further proposed for reducing motion blur of images shown on non-stroboscopic display devices, in which local areas $p_i$ of an image of a video signal are displayed during respective local display times $t_i$ that are less than or equal to a image period T, comprising means arranged for determining an amount $X_i$ of high spatial frequency content related to a local area $p_i$ of said image of said video signal, and means arranged for adjusting a local display time $t_i$ in dependence on said determined amount $X_i$ of high spatial frequency content, wherein said local display time $t_i$ is decreased with increasing determined amount $X_i$ of high spatial frequency content. Said device may for instance be integrated in or attached to a display device, or may represent an external module. A preferred embodiment of the present invention further comprises means arranged for adjusting the light intensity, with which said local area $p_i$ of said image of said video signal is displayed on said non-stroboscopic display, in dependence on said adjusted local display time $t_i$.

A further preferred embodiment of the present invention further comprises means arranged for determining an amount of temporal differences in said local area $p_i$ of said image of said video signal, wherein said local display time $t_i$ is only decreased with increasing determined amount $X_i$ of high spatial frequency content in dependence on said determined amount of temporal differences.

These and other aspects of the invention will be apparent from and elucidated with reference to the embodiments described hereinafter.

DETAILED DESCRIPTION OF THE INVENTION

The present invention proposes to control the display time $t_i$, which is related to a local area $p_i$ of an image of a video signal that is displayed on a non-stroboscopic display device, in dependence on a determined amount $X_i$ of High Spatial Frequency Content (HSFC) in said local area $p_i$ and optionally also in dependence on a determined amount of temporal differences in said local area $p_i$. With increasing amount $X_i$ of HSFC in local areas $p_i$ of said image, the display time $t_i$ is reduced to avoid motion blur.

Figure 1A:
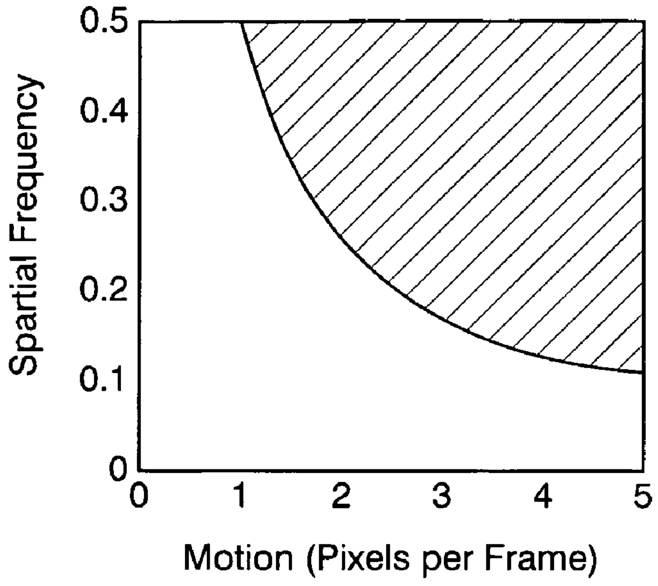
FIG. 1*a*: A schematic illustration of the spatial frequency transfer function of the display+eye combination as a function of motion and spatial frequency for a duty cycle of 100%.
Figure 1B:
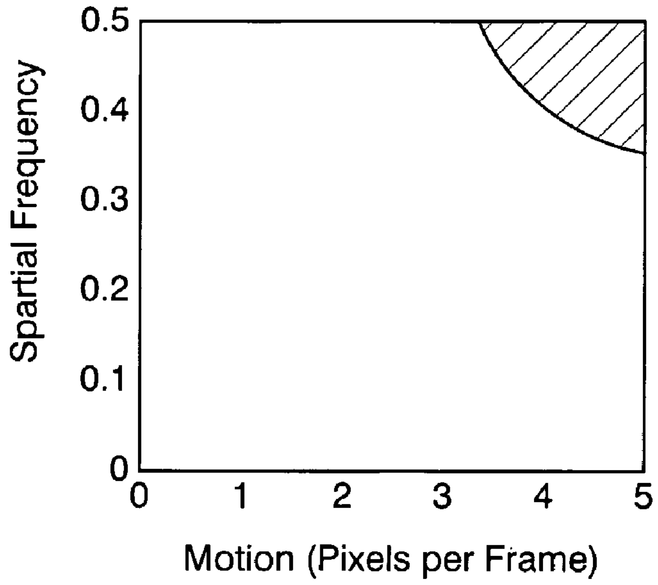
FIG. 1*b*: a schematic illustration of the spatial frequency transfer function of the display+eye combination as a function of motion and spatial frequency for a duty cycle of 30%.

The rationale behind this approach is depicted in FIGS. 1*a* and 1*b*, which schematically depict the spatial frequency transfer function of the display+eye combination as a function of the motion (in pixels per frame) and the spatial frequency for duty cycles of 100% (FIG. 1*a*), i.e. continuous light generation during the complete picture period such as in a regular active matrix LED or OLED display, and 30% (FIG. 1*b*), i.e. the display generates light for 30% of the image period and is switched off for 70% of the image period. Therein, the duty cycle denotes the ratio between display time $t_i$ and image period T, the shaded regions represent spatial frequency transfer function magnitudes between 0 and 0.5 (large attenuation of the associated frequencies), and the white regions represent spatial frequency transfer function magnitudes between 0.5 and 1 (low attenuation). A spatial frequency of 0.5 equals the nyquist frequency for the display: a pixelwise on-off pattern.

As can be readily seen from FIG. 1*a*, below spatial frequencies of 0.15, basically no attenuation occurs irrespective of the motion. However, higher spatial frequencies are attenuated, and the higher the spatial frequency, the lower the motion that is required to cause substantial attenuation (larger than 0.5) in the display+eye combination. The attenuation of these high spatial frequencies is perceived as motion blur by a viewer.

With respect to FIG. 1*b*, it is obvious that by reducing the duty cycle (display time), the threshold for which no attenuation irrespective of the motion occurs is increased to a spatial frequency of 0.35. The observation that with increasing spatial frequencies, lower motion is required to already cause substantial attenuation still holds, however, as compared to FIG. 1*a*, for the same spatial frequency, now a much larger motion is required to cause the same attenuation. This effect, i.e. the shifting of the spatial frequency from which attenuation starts to higher spatial frequencies when decreasing the duty cycle (display time), is due to the sinc-characteristic of the display+eye combination as already derived in Eq. (5).

TABLE 1

| Occurrences of motion blur | | | | |
|---|---|---|---|---|
| No. | Large Amount of HSFC | Motion | Resulting Motion Blur | Type of Image |
| 1 | No | No | No | Still image area, no HSFC |
| 2 | No | Yes | No | Moving image area, no HSFC |
| 3 | Yes | No | No | Still image area with HSFC |
| 4 | Yes | Yes | Yes | Moving image area with HSFC |

Table 1 lists the possibilities where motion blur might occur. The first condition for motion blur is the availability of HSFC in local areas $p_i$ of an image (No. 3 and 4 in Table 1). The second condition is that there has to be motion (No. 2 and 4 in Table 1). Both conditions must be true to result in motion blur.

The present invention proposes to test the first condition to be true (No. 3 and 4 in Table 1) when adapting the duty cycle. The duty cycle is then also adjusted in situations where it would not have been necessary (No. 3 in Table 1), but this case is by far outweighed by the possibility of a low-complexity implementation of the present invention when only testing for the amount of HSFC. Also, large area flicker is most visible in flat areas (no HSFC), so decreasing the duty cycle in No. 3 is not as bad as in cases No. 1 and No. 2.

Motion portrayal thus can be improved by decreasing the duty cycle (or display time $t_i$). However, when decreasing the duty cycle to a large extent, flicker has to be taken into account. Flicker increases with decreasing duty cycle and then may be perceived as annoying by a viewer. With a display that allows variation of the duty cycle per area $p_i$, the adaptation to the HSFC can also be don locally, which allows a more accurate choice from the cases in table 1.

Figure 2:
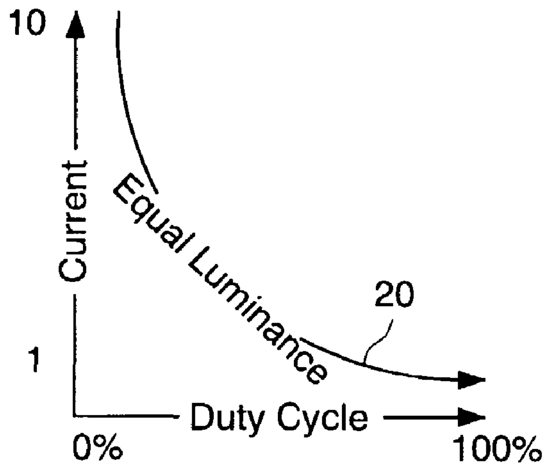
FIG. 2: a schematic illustration of the trade-off between driving current for the backlights of a non-emissive display or the light emitting diodes of an emissive display and duty cycle when displaying images on a non-stroboscopic display device with equal luminance.

Furthermore, to keep the total light output of the pixels of an image constant when reducing the duty cycle, and thus to avoid a reduction of overall brightness of the image, the intensity of the pixels should be inversely proportional to the duty cycle, as illustrated in FIG. 2, which depicts the trade-off between duty cycle and current fed to the LEDs or an emissive display or to the back-lights of a non-emissive display in order to achieve a constant luminance 20.

In particular at low duty cycles, high peak intensities may be required to achieve a constant luminance. For an LCD display this causes problems with the limited backlight intensity. A (polymer) organic LED display (OLED) in principle does not have a limited peak intensity, but with this type of display, the lifetime decreases when high peak currents are used (even when the total light output remains constant). Therefore, although OLEDs allow driving at much lower duty cycles than LCDs, in practice the lifetime will be an extra reason to drive the display at the highest possible duty cycle.

Figure 3:
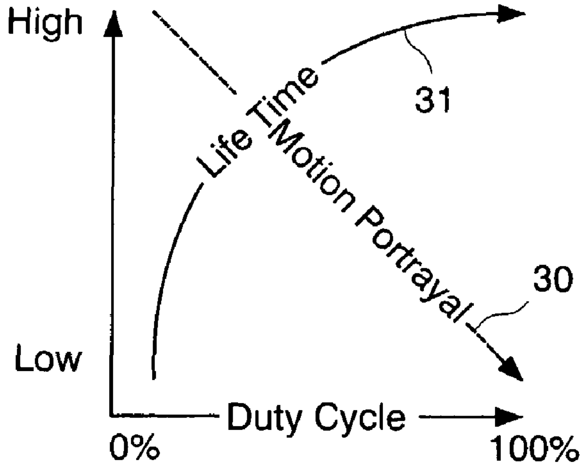
FIG. 3: a schematic illustration of the trade-off between life-time and motion portrayal quality when increasing the duty cycle for images displayed on a non-stroboscopic display device.

The relation between duty cycle and motion blur, at equal light output, thus results in a trade-off between motion picture quality 30, flicker (not depicted), and lifetime 31, as illustrated in FIG. 3. Controlling the duty cycle according to the present invention thus represents a dynamic adjusting of this trade-off. Note also that other displays, such as LCDs might also profit from increased lifetime, since the backlights also tend to degrade faster with higher peak luminance.

Figure 4:
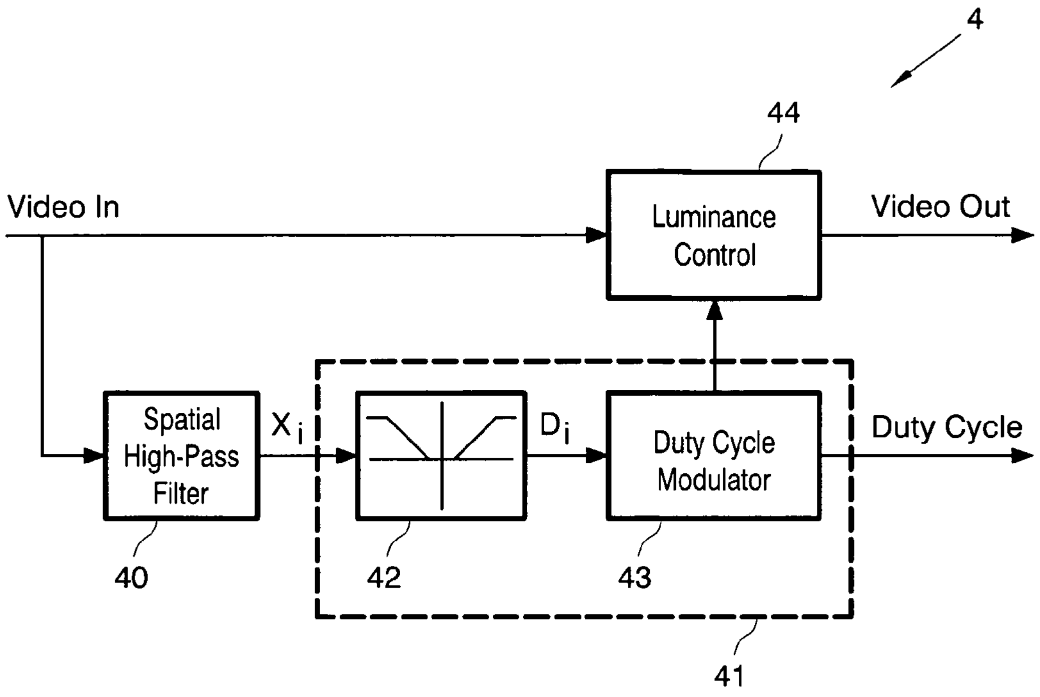
FIG. 4: a first embodiment of a system for reducing motion blur according to the present invention, based on adjusting a display time (duty cycle) in dependence on the amount of high spatial frequency content in local areas of images of a video signal.

FIG. 4 depicts an according first embodiment 4 of the present invention that performs an adjustment of the display time/duty cycle in dependence on the determined amount of HSFC in local areas of an image of a video signal. To this end, an input video signal is first fed into a high-pass filter 40. Therein, a local area $p_i$ of an image of said input video signal, for instance comprising several adjacent pixels of said image, is filtered with a spatial frequency domain low-pass filter and may be further processed to obtain a measure for the amount of HSFC in said local area $p_i$. In the most simple case, the absolute of the filter outputs are summed to obtain a measure for the amount $X_i$ of HSFC in said local area $p_i$. The determined amount $X_i$ of HSFC is then fed to a duty cycle adjustment instance 41, which is composed of a limiting function instance 42 and a duty cycle modulator 43. In the limiting function instance 42, the determined amount $X_i$ of HSFC is processed by clipping, coring and normalizing to obtain a drive value $D_i$ for the duty cycle modulator 43, which is defined as:

$$D_i = \begin{cases} 0 & \forall\, |X_i| < k_1 \\ a(X_i - k_1) & \forall\, k_1 \le |X_i| \le k_2 \\ 1 & \forall\, |X_i| > k_2 \end{cases} \tag{6}$$

Therein, $k_1$ and $k_2$ are thresholds that allow the minimum and maximum duty cycle to be used for a range of 'HSFC levels', and that allows a transition region to be defined where the switch from short to long duty cycles takes place. $\alpha$ is a parameter for adjusting the slope of this transition. The duty cycle modulator 43 calculates the duty cycle $t_i$ based on the drive value $D_i$:

$$\text{Duty Cycle} = t_i/T = b(1-D), \tag{7}$$

wherein b is an accordingly selected parameter.

Note that the limiting function instance 42 can also be seen as part of the spatial high pass-filter 40, or as part of the duty cycle modulator 43; this does not influence the overall functionality.

The luminance control instance 44 adjusts the input video signal in response to the adjusted duty cycle such that the instantaneous light output of the display segment associated with the local area $p_i$, for which the duty cycle is currently adjusted, results in the correct luminance. This may be necessary in case the duty cycle control of the display itself does not correct for luminance, or in case of an OLED display (or other emissive displays), where the intensity is directly determined by the video (drive values) and not also by a backlight.

In the most flexible form, the duty cycle is varied continuously between a minimum (e.g. 20%), and a maximum (likely 100%), depending on the image characteristics. In some cases, a limited set of duty cycles to choose from can be used. However, with a display that allows the duty cycle to be varied per pixel (an OLED can in principle do this), it is not advisable to actually create large differences between the duty cycles of neighboring pixels. This will cause inconsistencies in the spatio-temporal light emission pattern, that can cause unwanted effects depending on the eye tracking of the viewer.

The modulation of the duty cycle is not the only way to influence the motion blur—lifetime (and flicker) trade-off. Any other method can also be used to modulate the temporal light emission, for example the addition of a bias to the DC value. This gives more or less the same trade-off as with a varying duty cycle (both regarding flicker and lifetime), and therefore the present invention also works with this type of duty cycle modulation (the bias method can also be seen as a form of duty cycle modulation, by creating a mixture of two duty cycles, 100% and e.g. 30%, resulting in an effective duty cycle somewhere in between).

As already discussed for the first embodiment of the present invention, adjusting the display time $t_i$/the duty cycle only in dependence on the determined amount of HSFC may lead to a reduction of the duty cycle even in cases when no actual motion blur is to be combated (case No. 3 in Table 1). Thus according to a second embodiment of the present invention, the amount of temporal differences in the local areas $p_i$ is additionally determined and considered in the adjustment of the display time $t_i$/duty cycle. This may for instance be accomplished by adding a frame memory to the first embodiment 4 of FIG. 4. Now besides spatial frequency characteristics, temporal image characteristics can be determined, which represent a coarse indication of motion. In the simplest form, the determination of said temporal differences may be embodied as a temporal high-pass, which gives per pixel of a local area $p_i$ only the a value indicative of motion, but not of the direction of the motion.

Having such coarse information about motion in the image, the adjustment of the duty cycle can be influenced more reliably. In case of HSFC, but no motion in the image, the duty cycle can still be large without causing motion blur.

Table 2 lists the possible cases where motion blur occurs. The second column indicates the test for HSFC, and the fourth column indicates test for a large amount of temporal differences.

From the eight listed cases, only in two cases a large amount of HSFC and a large amount of temporal differences is indicated (No. 1 and 4), and according to the second embodiment of the present invention, the duty cycle is only reduced in these two cases. This may for instance be implemented by introducing a threshold for the amount of temporal differences, and demanding that the duty cycle is only reduced due to a determined large amount of HFSC if the determined amount of temporal differences is above this threshold. This approach of the present invention correctly detects case No. 3 of Table 2, where motion blur actually occurs, and also correctly detects case No. 2, where no motion blur occurs, but does not correctly detect case No. 4, and causes a false alarm in case No. 1. However, case No. 4 describes a rare case, wherein the speed (amount of motion) is equal to the spatial frequencies of the image area, and case 1 describes a noisy image area, wherein any algorithm is most likely to fail.

Thus when compared to the first embodiment of the present invention, the addition of a simple estimation technique to determine the amount of temporal differences in local areas $p_i$ according to the second embodiment helps to avoid a reduction of the duty cycle in case No. 2 of Table 2 (corresponding to case 3 of Table 1) and otherwise, apart from rare or noisy cases, identifies the correct cases where a reduction of the duty cycle to combat motion blur is required. Thus the duty cycle is only reduced when it is actually required, which reduces flicker and increases the lifetime of the display device.

TABLE 2

Occurrences of motion blur (refined)

| No. | Large Amount of HSFC | Motion | Large Amount of Temporal Diff. | Resulting Motion Blur | Type of Image |
|---|---|---|---|---|---|
| 1 | Yes | No | Yes | No | Noisy image area |
| 2 | Yes | No | No | No | Still image area with HSFC |
| 3 | Yes | Yes | Yes | Yes | Moving image area with HSFC |
| 4 | Yes | Yes | No | Yes | Rare case: speed equal to spatial freq. of image area |

TABLE 2-continued

| Occurrences of motion blur (refined) | | | | | |
|---|---|---|---|---|---|
| No. | Large Amount of HSFC | Motion | Large Amount of Temporal Diff. | Resulting Motion Blur | Type of Image |
| 5 | No | No | No | No | Still image area with no HSFC |
| 6 | No | Yes | No | No | Moving image part with no HSFC |
| 7 | No | No | Yes | No | Rare case: flickering still image area, no HSFC |
| 8 | No | Yes | Yes | No | Unexplained |

Figure 5:
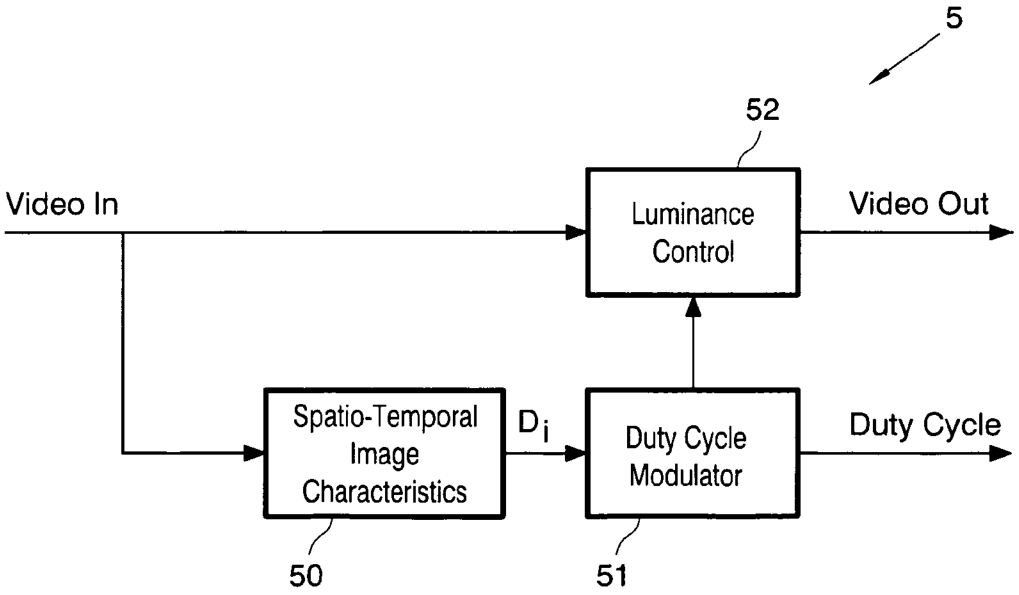
FIG. 5: a second embodiment of a system for reducing motion blur according to the present invention based on adjusting a display time (duty cycle) in dependence on the amount of high spatial frequency content and the amount of temporal differences in local areas of images of a video signal.

FIG. 5 depicts the basic set-up of the second embodiment 5 of the present invention. Therein, the input video signal is analyzed in a spatio-temporal image characteristics instance 50, where the local areas $p_i$ of images of said input video signal are for instance filtered in the spatial frequency and temporal frequency domain to determine the amount of HSFC and the amount of temporal differences, and, based on these results, a drive value $D_i$ (corresponding to the local area $p_i$) for the duty cycle modulator 51 is determined. The duty cycle as determined by the duty cycle modulator 51 is then forwarded to the emissive or non-emissive non-stroboscopic display, and also to a luminance control instance 52, which adjusts the input video signal in response to the duty cycle such that the instantaneous light output of the display segment associated with the local area $p_i$, for which the duty cycle is currently adjusted, results in the correct luminance.

The invention has been described above by means of preferred embodiments. It should be noted that there are alternative ways and variations which are obvious to a skilled person in the art and can be implemented without deviating from the scope and spirit of the appended claims.

The invention claimed is:

1. A method for reducing motion blur of images shown sequentially on non-stroboscopic display devices, in which local areas $p_i$ of an image of a video signal are displayed during respective local display times $t_i$ that are less than or equal to an image period T, comprising:

determining, via a spatial high pass filter, an amount $X_i$ of high spatial frequency content related to a respective local area $p_i$ of said image of said video signal, wherein the respective local area $p_i$ represents a group of adjacent pixels of said image;

determining, via a frame memory or a temporal low-pass filter, an amount of temporal differences in said respective local area $p_i$ of two subsequent images of said video signal, in which the amount of temporal differences is representative of (i) a course measure of an amount of motion, but not a direction of the motion, of objects in an image, from one image to a next image, wherein determining the amount of temporal differences comprises (i) subtracting corresponding pixels of corresponding local areas $p_i$ in two subsequent images of said video signal or (ii) by temporal low-pass filtering said video signal; and adjusting, via a duty-cycle adjustment instance, a local display time $t_i$ corresponding to the respective local area $p_i$ in dependence on (a)(i) said determined amount $X_i$ of high spatial frequency content related to the respective local area $p_i$ and (a)(ii) said determined amount of temporal differences, wherein said local display time $t_i$ corresponding to the respective local area $p_i$ is only decreased with (b)(i) the determined amount $X_i$ of high spatial frequency content for the respective local area $p_i$ increasing within a given range of high spatial frequency content levels and (b)(ii) the determined amount of temporal differences being above a temporal differences threshold amount, wherein the temporal differences threshold amount is representative of course information about motion of objects in said image, from one image to a next image, sufficient for motion blur to occur, further wherein adjusting, by decreasing the local display time $t_i$ is avoided in an absence of motion blur.

2. The method according to claim 1, wherein said determining of said amount $X_i$ of high spatial frequency content related to said respective local area $p_i$ of said image of said video signal comprises filtering said respective local area $p_i$ with a spatial frequency domain high-pass filter to obtain said amount $X_i$ of high spatial frequency content related to said respective local area $p_i$ of said video signal.

3. The method according to claim 2, wherein samples, or a corresponding magnitude of the samples, output by said spatial frequency domain high-pass filter are summed to obtain said amount $X_i$ of high spatial frequency content related to said respective local area $p_i$ of said image of said video signal.

4. The method according to the claim 1, wherein said corresponding local display time $t_i$ is set to a maximum value if said amount $X_i$ of high spatial frequency content is below a first threshold $k_1$, and wherein said corresponding local display time $t_i$ is set to a minimum value if said amount $X_i$ of high spatial frequency content is above a second threshold $k_2$.

5. The method according to claim 4, wherein said corresponding local display time $t_i$ decreases from said maximum value to said minimum value when said amount $X_i$ of high spatial frequency content increases from said first threshold $k_1$ to said second threshold $k_2$.

6. The method according to claim 5, wherein said corresponding local display time $t_i$ decreases linearly from said maximum value to said minimum value.

7. The method according to claim 1, further comprising:

adjusting the light intensity, with which said respective local area $p_i$ of said image of said video signal is displayed on said non-stroboscopic display, in dependence on said adjusted local display time $t_i$, corresponding to said respective local area $p_i$.

8. The method according to claim 1, wherein said local display time stems from a limited set of discrete local display times.

9. The method according to claim 1, wherein said determining of said amount $X_i$ of high spatial frequency content related to said respective local area $p_i$ of said image of said video signal is based on an area of said image of said video signal that is larger than said respective local area $p_i$, wherein the larger area comprises adjacent pixels or areas around said respective local area $p_i$.

10. A non-transitory computer-readable medium embodied with a computer program having instructions operable to cause a processor to perform the method steps of claim 1.

11. A computer program product comprising a computer program with instructions operable to cause a processor to perform the method steps of claim 1.

12. A device for reducing motion blur of images shown sequentially on non-stroboscopic display devices, in which local areas $p_i$ of an image of a video signal are displayed during respective local display times $t_i$ that are less than or equal to a image period T, comprising:

means including a spatial high pass filter for determining an amount $X_i$ of high spatial frequency content related to a respective local area $p_i$ of said image of said video signal, wherein the respective local area $p_i$ represents a group of adjacent pixels of said image;

means for determining an amount of temporal differences in said respective local area $p_i$ of two subsequent images of said video signal, in which the amount of temporal differences is representative of (i) a course measure of an amount of motion, but not a direction of the motion, of objects in an image, from one image to a next image, wherein determining the amount of temporal differences comprises (i) subtracting corresponding pixels of corresponding local areas $p_i$ in two subsequent images of said video signal or (ii) by temporal low-pass filtering said video signal; and means for adjusting a local display time $t_i$ corresponding to the respective local area $p_i$ in dependence on (a)(i) said determined amount $X_i$ of high spatial frequency content related to the respective local area $p_i$ and (a)(ii) said determined amount of temporal differences, wherein said local display time $t_i$ corresponding to the respective local area $p_i$ is only decreased with (b)(i) the determined amount $X_i$ of high spatial frequency content for the respective local area $p_i$ increasing within a given range of high spatial frequency content levels and (b)(ii) the determined amount of temporal differences being above a temporal differences threshold amount, wherein the temporal differences threshold amount is representative of course information about motion of objects in said image, from one image to a next image, sufficient for motion blur to occur, further wherein adjusting, by decreasing the local display time $t_i$ is avoided in an absence of motion blur.

13. The device according to claim 12, further comprising:

means for adjusting the light intensity, with which said respective local area $p_i$ of said image of said video signal is displayed on said non-stroboscopic display, in dependence on said adjusted local display time $t_i$ corresponding to said respective local area $p_i$.

* * * * *